United States Patent [19]

Norris

[11] Patent Number: 5,197,216
[45] Date of Patent: Mar. 30, 1993

[54] COMBINED CAMOUFLAGE AND DECOY DEVICE

[76] Inventor: Raymond E. Norris, P.O. Box 39, Mannford, Okla. 74044

[21] Appl. No.: 780,701

[22] Filed: Oct. 18, 1991

[51] Int. Cl.⁵ .......................................... A01M 31/06
[52] U.S. Cl. ............................................ 43/1; 43/2; 135/90
[58] Field of Search ...................... 43/1, 2, 3; 135/87, 135/88, 90, 901; 446/369

[56] References Cited

U.S. PATENT DOCUMENTS

| | | | |
|---|---|---|---|
| 586,145 | 7/1897 | Sievers, Jr. | 43/2 |
| 1,630,165 | 5/1927 | Butler | 446/369 |
| 1,732,316 | 10/1929 | Scott | 446/369 |
| 3,163,418 | 12/1964 | Myers | 446/369 |
| 3,460,286 | 8/1969 | Danberg | 446/369 |
| 4,208,832 | 6/1980 | Corriveau | 446/369 |
| 4,505,687 | 3/1985 | Munro | 446/369 |
| 4,581,837 | 4/1986 | Powlus | 43/2 |
| 4,682,436 | 7/1987 | Ritson | 43/1 |
| 4,773,178 | 9/1988 | Marek | 43/2 |
| 4,821,444 | 4/1989 | Remus | 43/2 |
| 4,829,694 | 5/1989 | Oasheim | 43/2 |

FOREIGN PATENT DOCUMENTS 2013508 8/1979 United Kingdom ................ 446/100

Primary Examiner—Richard K. Seidel
Assistant Examiner—Chuck Y. Mah
Attorney, Agent, or Firm—Head & Johnson

[57] ABSTRACT

A combined camouflage and decoy device which includes a suspension mechanism such as a cap wearable on the head of a hunter. A cape is suspended from and hangs freely from the suspension mechanism. A decoy extends outward from the suspension mechanism. The hunter will be allowed to impart movement to the decoy to attract animals.

4 Claims, 2 Drawing Sheets

COMBINED CAMOUFLAGE AND DECOY DEVICE

BACKGROUND OF THE INVENTION

1. Field of the Invention

The present invention relates to a combined device used as a decoy to lure animals within gunshot of a hunter and to camouflage the hunter from the animals.

2. Prior Art

Use of camouflage clothing by hunters is widespread. With most wild animals, the sight of a hunter will cause the animals to run or flee. Accordingly, various measures are taken to conceal the hunter from the animals. Near water, blinds are often constructed to conceal the hunter. In fields, the hunter will often hide underneath a blanket or tarp.

In addition to camouflage of the hunter, in water fowl hunting, artificial birds or decoys are used to attract live birds within gunshot. Often times, these decoys will be placed in fields or in the water, as if they were feeding.

More recently, oversized decoys have been utilized in order to attract birds flying at a high altitude. Some of these decoys are rotatable in response to the wind. Others are primarily wind socks which fill up and move in response to movement of the wind. An objective of these decoys is to provide a more realistic decoy by having some movement which serves to attract the attention of the flying birds.

None of the known devices combines both a camouflage device and a decoy device.

Accordingly, it is a principal object and purpose of the present invention to provide a combined device capable of camouflaging a hunter and at the same time providing a decoy device.

It is a further object and purpose of the present invention to provide a combined camouflage and decoy device wherein movement of the hunter will impart realistic movement to the decoy portion of the device.

SUMMARY OF THE INVENTION

The combined camouflage and decoy device of the present invention is suspended from and supported by the head of a hunter. The device includes a cap which fits on the head of the hunter. Suspended from the cap is a cape which hangs therefrom. The cape hangs freely and is unattached except of the cap.

The cape surrounds the entire body of the hunter except for at the face. Accordingly, the cape provides an effective camouflage so that the hunter will not be seen by the animals.

Extending outward from the cap near the face of the hunter is a visor which serves to shield the hunter's eyes from the sun and serves to conceal the hunter's face from birds flying overhead.

Extending outward and generally upward from the cap is a decoyed portion. The decoyed portion includes a neck and a head. The decoy portion will be constructed to match the variety of bird being hunted. The decoyed portion would be constructed of a thin, flexible shell. The interior to the shell is a loose packed stuffing.

As the cape is connected at the lower portion of the decoyed portion, the cape generally forms the lower body of the decoy.

The cap itself has an adjustable band so that the circumference of the band may be shortened or lengthened to accommodate the heads of hunters of various sizes.

The cap has a flexible top. The loose packed stuffing in the decoyed portion rests on and is in communication with the top of the cap. When it is desirable to store or carry the device the top of the cap may be flexed inward. By flexing the top of the cap, a portion of the loose packed stuffing will be displaced from within the shell on the decoyed portion. Accordingly, the decoy portion may then be folded for ease of storage or carrying.

DETAILED DESCRIPTION OF THE PREFERRED EMBODIMENTS

Figure 1:
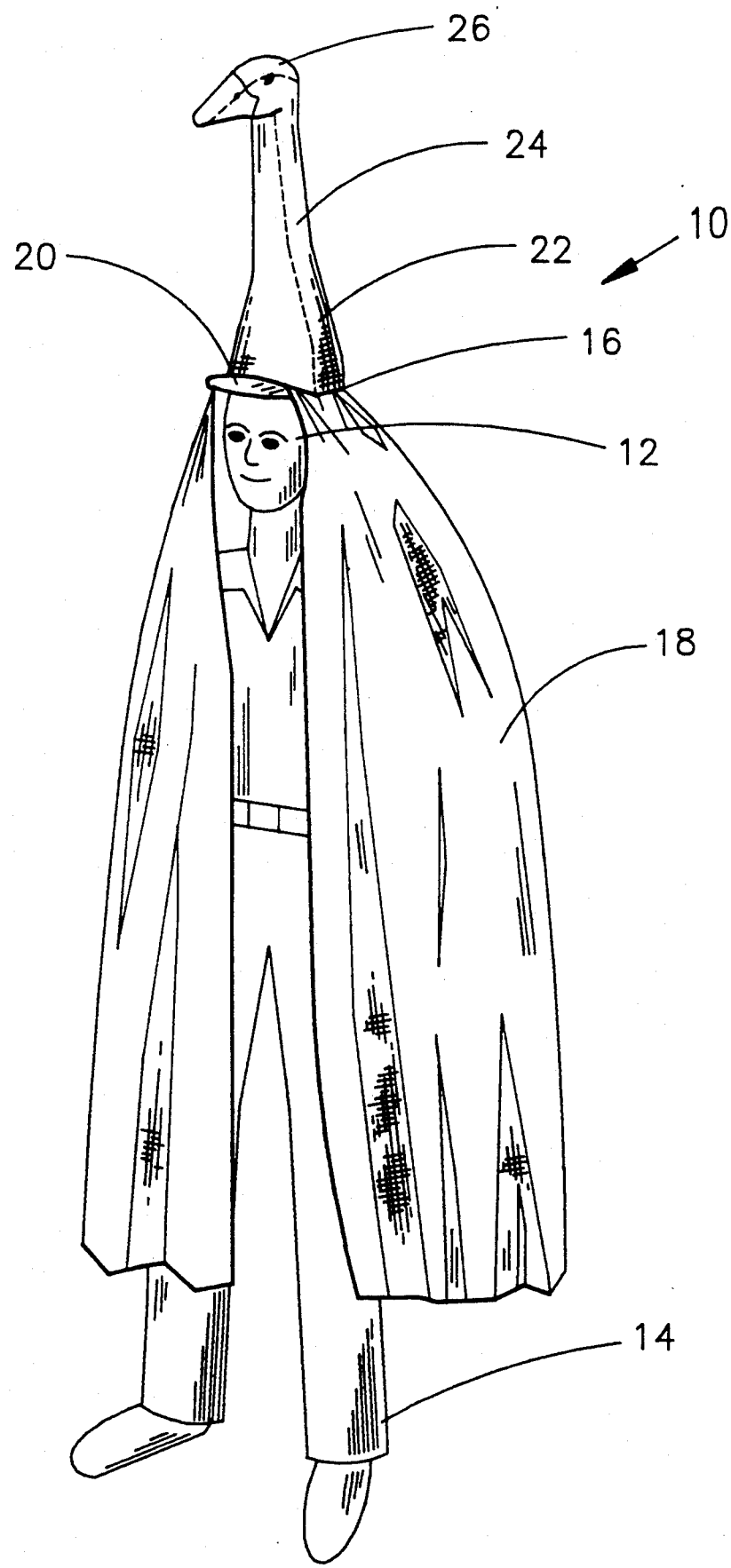
FIG. 1 is a perspective view of the present invention shown on a hunter.

Referring to the drawings in detail, FIG. 1 illustrates a perspective view of a combined camouflage and decoy device 10. The device 10 is shown worn on and suspended from a hunter 14. The device may be worn while the hunter is standing, as shown in FIG. 1, and may also be worn while sitting or walking.

The device 10 is suspended from and supported by the head of the hunter 14. In the embodiment shown in FIG. 1, the device 10 includes a cap 16 which fits on the head of the hunter. Suspended from the cap 16 is a cape 18 which hangs therefrom. The cape 18 hangs freely and is unattached except at the cap. The length of the cape 18 will be chosen dependent on the size of the hunter.

The cape 18 surrounds the entire body of the hunter except for at the face. Accordingly, the cape 18 will provide an effective camouflage so that the hunter will not be seen by the animals. In the present embodiment, the cape 18 is constructed of a nylon material. It will be understood, however, that other materials may be utilized.

Extending outward from the cap 16 near the face of the hunter 14 is a visor 20. The visor serves two purposes. The visor shields the hunter's eyes from the sun when looking at the sky for flying birds. Additionally, and importantly, the visor serves to conceal the hunter's face from birds flying overhead.

Extending outward and generally upward from the cap 16 is a 10 decoy portion 12, having a neck 24 and a head 26. The decoy portion 22 will be constructed to match the type of bird being hunted. The decoy portion of the device may be constructed to emulate any of the various species of ducks or geese. For instance, for white birds, the decoy portion would be fabricated from a white material or painted white. As arranged, the Cape 18 generally forms the lower portion or body of the decoy. With the decoy 10 in place, it will be observed that movement of the hunter, in particular the hunter's head, will cause the decoy portion 22 to move. Accordingly, movement of the hunter 14 will not necessarily be a negative factor.

The decoy portion 22 is constructed of a thin, flexible shell. It has been found that a waterproof nylon material is particularly suitable for this purpose. It is resistant to the elements and lightweight to carry. Other materials might also be employed. The shell might be solidly or firmly packed with material, such as a cushion.

Interior to the shell is a loose packed stuffing (not seen in FIG. 1). Peanut-shaped styrofoam is lightweight and has been found to be suitable for this purpose.

Figure 2:
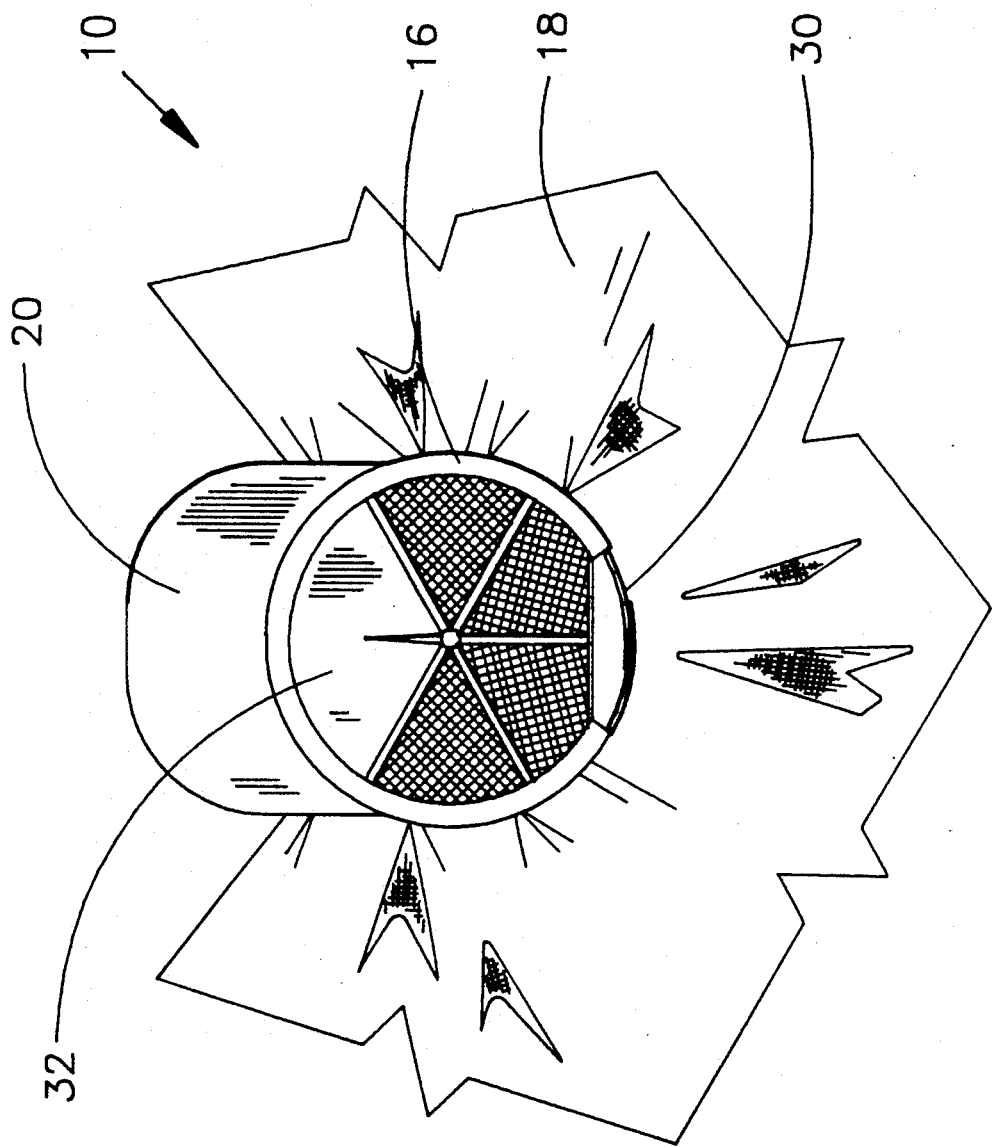
FIG. 2 is a view of the underside of a combined camouflage and decoy device seen in FIG. 1 apart from the hunter.

FIG. 2 shows the underside of the device 10 apart from the hunter 14. The underside of the cape 18 as well as the underside of the visor 20 is shown.

The cap 16 has an adjustable band 32 so that the circumference of the band may be shortened or lengthened to accommodate the heads of hunters of various sizes.

The cap 16 has a flexible top 32, the underside of which is visible in FIG. 2. The loose-packed stuffing in the decoy portion (not shown) rests on and is in communication with the top of the cap. When it is desirable to store or carry the device 10, the top 32 of the cap 16 may be flexed inward. By flexing the top of the cap, a portion of the loose-packed stuffing will be displaced from within the shell of the decoy portion 22. The decoy portion 22 may then be folded for ease of storage or carrying.

Whereas, the present invention has been described in relation to the drawings attached hereto, it should be understood that other and further modifications, apart from those shown or suggested herein, may be made within the spirit and scope of this invention.

What is claimed is:

1. A combined camouflage and decoy device which comprises:

suspension means receivable on the head of a hunter, said suspension means including a cap having a flexible top;

a cape suspended from and hanging freely from said suspension means;

a decoy extending outward from said suspension means, said decoy including a flexible outer shell and loose packed stuffing within said shell, wherein said stuffing is in communication with said flexible top;

whereby the movement of said hunter imparts movement to said decoy, and wherein flexing of said top inwardly will allow partial displacement of said stuffing from said shell for packing or storage of said device.

2. A combined camouflage and decoy device as set forth in claim 1 wherein said suspension means includes a cap having an adjustable band, said cape being suspended from said cap.

3. A combined camouflage and decoy device as set forth in claim 2 wherein said cap has an extending visor.

4. A combined camouflage and decoy device as set forth in claim 1 wherein said cape forms the body of said decoy concealing said hunter in said cape.

* * * * *